July 23, 1929.  F. M. MILES  1,721,635
MEASURING DEVICE
Filed Feb. 28, 1928  2 Sheets-Sheet 1
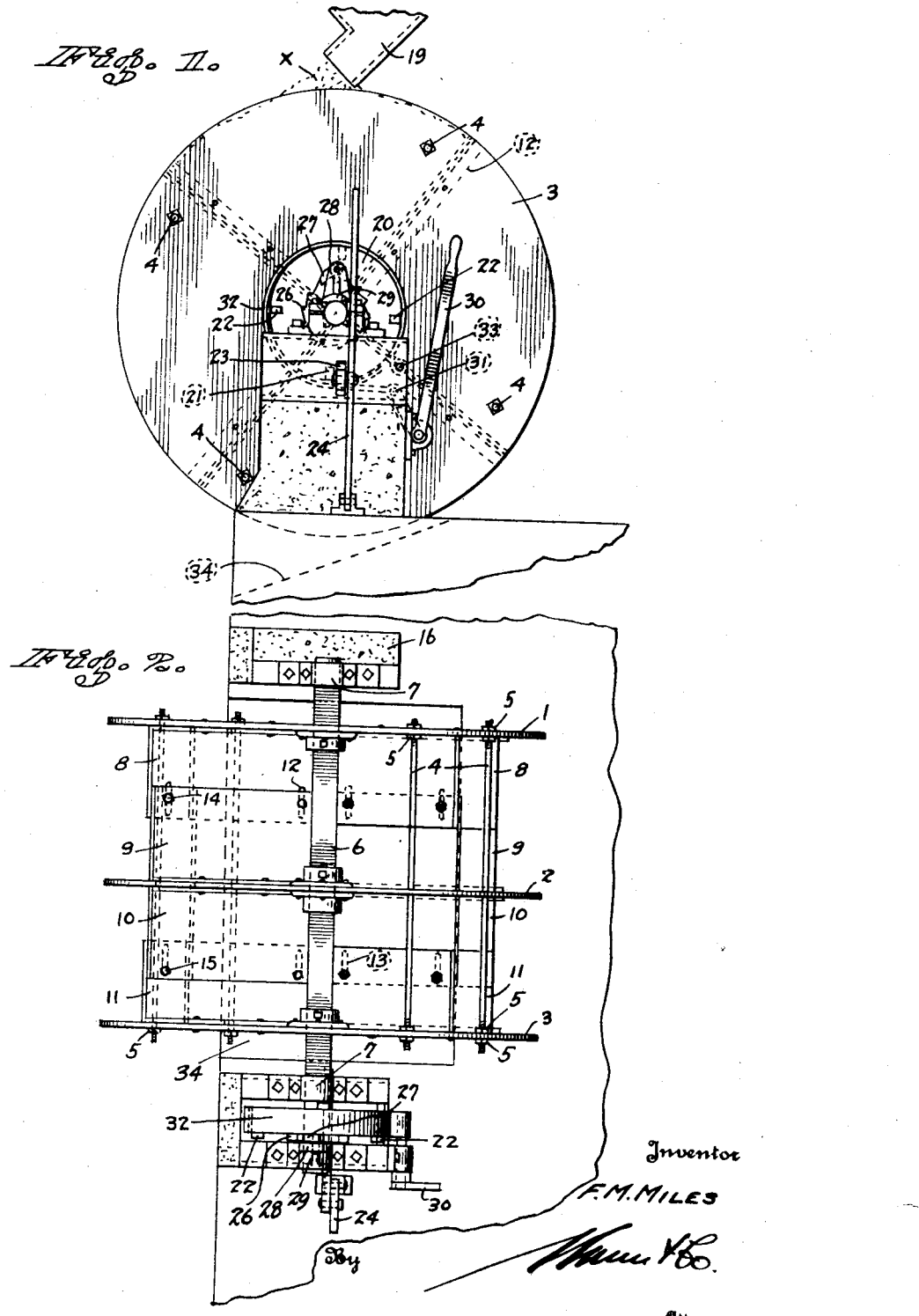
Inventor
F. M. MILES
By
Attorneys July 23, 1929.  F. M. MILES  1,721,635
MEASURING DEVICE
Filed Feb. 28, 1928  2 Sheets-Sheet 2
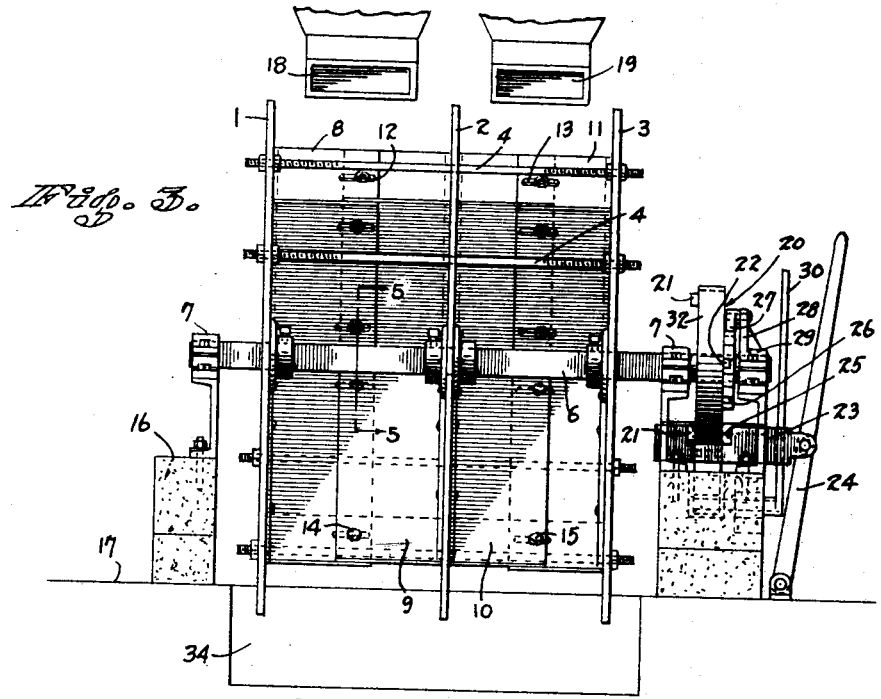
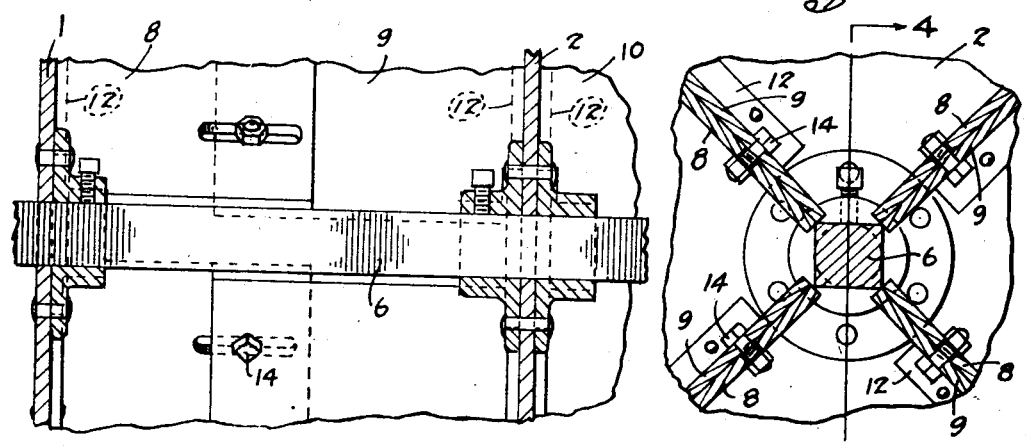
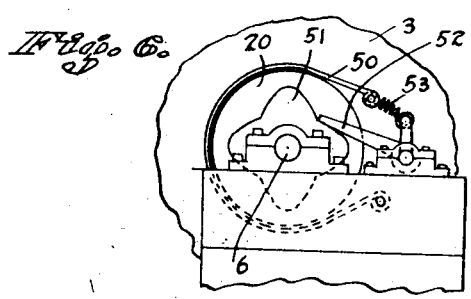
Inventor
F. M. MILES
Attorneys.

Patented July 23, 1929. 1,721,635

UNITED STATES PATENT OFFICE.

FRANK M. MILES, OF TACOMA, WASHINGTON.

MEASURING DEVICE.

Application filed February 28, 1928. Serial No. 257,770.

My invention relates to improvements in measuring devices, and it consists in the combinations, constructions, and arrangements hereinafter described and claimed.

An object of my invention is to provide a measuring device that employs novel means for automatically stopping the flow of material into the device when the proper quantity of material has been received, the material itself acting as a gate for cutting off any additional flow of material into the device. The device is adjustable, so that different quantities of material may be measured and two or more different kinds of material may be measured at the same time, and the quantities of these two materials may vary with respect to each other, or may be the same, according to the will of the operator.

A further object of my invention is to provide a device of the type described that employs a release mechanism for dumping the measured contents, the dumping operation being actuated by the weight of the material itself. The release mechanism is designed for releasing the measured quantity of material, and for bringing an empty compartment into registry with the delivery spout. If more than one compartment is used, the device will bring a plurality of compartments into registration with a plurality of delivery spouts each time the release mechanism is actuated.

A further object of my invention is to provide a device of the type described that employs novel braking mechanism, that applies the greatest braking pressure to the device when the device carries the greatest amount of material, and automatically relieves this pressure when the device reaches a state of repose after the contents have been emptied.

Other objects and advantages will appear in the following specification, and the novel features of my invention will be particularly pointed out in what I hereinafter claim.

My invention is illustrated in the accompanying drawing forming a part of this application, in which:

Figure 1 is a side elevation of the device;
Figure 2 is a top plan view of the device;
Figure 3 is a front elevation of the device;
Figure 4 is a section along the line 4—4 of Figure 5;
Figure 5 is a section along line 5—5 of Figure 3; and
Figure 6 is a view of the brake mechanism.

In carrying out my invention I provide a measuring device that consists of a drum having a plurality of discs 1, 2, and 3. The discs 1 and 3 are secured to each other, and are held in adjusted position with respect to each other by bolts 4 and lock nuts 5. The end discs rotate as a unit, because they are mounted on a square shaft 6, this shaft having rounded ends that are journalled in bearings 7. An adjustment of the nuts 5 permits the ends 1 and 3 to be moved toward or away from each other.

The disc 2 is adjustable on the shaft 6, and may be equally spaced from the ends 1 and 3, or may be disposed nearer either one of the ends. The discs 1, 2, and 3 carry transversely extending members 8 and 9, also 10 and 11. The disc 1 carries members 8, and the disc 2 carries members 9 and 10, while the disc 3 carries members 11. I have shown the members as being provided with flanges 12, see Figure 1, that permits them to be rigidly secured to the disc. I have shown the discs 1 and 3 as being provided with eight members. Four of the members on the disc 2 cooperate with the members on the disc 1, while the other four cooperate with the members on the disc 3.

The means for adjustably securing the cooperating members together, is shown in Figures 4 and 5, and also in Figure 3. The members 8 have slots 12 therein, and the members 11 have slots 13 therein. The members 9 have openings for carrying bolts 14 and these bolts are slidably received in the slots 12, and may be tightened for securing members 8 and 9 in adjusted position. In like manner bolts 15 are carried by the members 10, and these bolts are slidably received in the slots 13 and may be tightened when the members 10 and 11 are disposed in the position desired.

It will be seen from this construction that I have provided four compartments between the discs 1 and 2, and four compartments between the discs 2 and 3. The compartments first mentioned are of equal capacity, and the compartments last mentioned are of equal capacity, although the latter compartments may have a different capacity from the first.

The device when being loaded takes the position shown in Figure 1. The device is supported by columns 16 that rest upon a base 17. Spouts 18 and 19 convey material into the compartments. The device will have a tendecy to rotate in a counter-clockwise direction when looking at Figure 1, as soon as the compartment disposed beneath the spout 19 is filled. This is because the greater portion of the compartment is disposed on the lefthand side of the shaft 6. Of course, the spout 18 is delivering material to the compartment disposed therebeneath at the same time the sput 19 is delivering material to its compartment.

The material will continue to flow from the spouts 18 and 19 until the compartments are filled, at which time the material will back up against the spouts, as shown at X, and will cut off further flow.

I provide a novel means for releasing the device, and for permitting the filled compartment to move through a quarter of a circle, thus causing the material to be dumped. An empty compartment will be brought into registration with each spout during this movement, and these empty compartments will be filled in the same manner as already stated. The releasing mechanism comprises a brake drum 20 that carries two diametrically opposed lugs 21 on one side, and two diametrically opposed lugs 22 on the opposite side. The lugs 22 are disposed a quarter of a circle further around than the lugs 21. A stop member 23, actuated by a hand lever 24, has a recess 25 for receiving the lower portion of the brake drum. The vertical edges of this recess act as stops. A movement of the lever 24 will reciprocate the stop member 23.

Assume that two of the compartments have been filled, that the operator desires to dump these compartments and to bring two empty ones into registration with the spouts. He moves the lever 24, which releases the lug 21 that is shown bearing against the stop member 23 in Figure 3. The weight of the material in the filled compartments will rotate the device in a counter-clockwise direction. When the lug 21 is freed, the operator continues to move the lever 24 in the same direction and brings the opposite vertical side of the recess 25 into abutting relation with one face of the brake drum. The turning of the device will swing the brake drum and the drum will carry the next lug 22 against the stop member 23, whereupon the device is brought to a stand-still. It will therefore be seen that a rocking of the lever 24 will intermittently release the device for dumping each compartment when filled.

A pawl and ratchet mechanism prevents rotation of the device in a clockwise direction. Figure 1 shows how the ratchet 26 is carried by the shaft 6 and how the pawl 27 is carried by a projection 28 that extends upwardly from a shaft bearing 29.

In Figures 1, 2, and 3 I show a hand operated brake, while in Figure 6 I show an automatic brake. The hand operated brake comprises a lever 30 that is connected at 31 to one end of a brake band 32. The opposite end of the brake band is secured to a stationary support at 33. A swinging of the lever 30 controls the braking force applied to the brake drum 20.

Reference to Figure 6 shows a brake band 50 encircling the drum 20. A star-shaped cam 51 is mounted upon the shaft 6 and turns therewith. A brake actuating arm 52 bears against this cam and is operatively connected to the brake band 50 through the medium of a spring 53. A releasing of the lever 24 will cause the star-shaped cam 51 to rotate with the device. As the device turns and gains momentum, the arm 52 is swung and applies a braking force to the drum 20. This force is gradually increased as the device 1 tends to gather speed, and therefore the rotation of the device is slowed down considerably. The cam is so arranged that it will release the arm 52 when the contents have been dumped. It will therefore be seen that the greatest braking pressure is applied at the time the weight of the material exerts the most force, and this braking pressure is relieved when the drum reaches a state of repose.

I have shown the compartments as dumping into a common chute 34 where the materials from both compartments will be mixed. It is obvious that if it is desired to keep the materials separate, a partition can divide the chute 34 into a double chute.

Although I have shown and described two embodiments of my invention, it is to be understood that the same is susceptible of various changes and I reserve the right to employ such changes as may come within the scope of the invention as claimed.

I claim:

1. A measuring device comprising a plurality of compartments radially disposed about a common center, means for holding said compartments against rotation, means for filling said compartments, said filled compartments tending to rotate into a dumping position, means for releasing said holding means for permitting this movement, said releasing means automatically bringing an empty compartment into a filling position when said filled compartment reaches a dumping position.

2. A measuring device comprising a plurality of radially disposed compartments, stopping means for holding any one of said compartments beneath a filling spout, each compartment, when filled, being movable by its own weight into a dumping position, means for normally preventing this movement, means for releasing said filled compartment, and for stopping further movement of said compartment when it reaches dumping position, and a braking mechanism for automatically applying the greatest braking force at the time the weight of the material exerts the most force in swinging the compartment.

3. A brake comprising a star-shaped cam, a brake drum, a brake band encircling said drum, said cam and drum turning as a unit, and an arm operatively connected to said band, and to said cam for applying various pressures to said brake drum.

4. A measuring device comprising a plurality of rows of adjustable compartments radially disposed about a common center, manually controlled means for holding each row of said compartments beneath filling spouts, said compartments being swingable into dumping position by the weight of material contained therewithin, means for releasing said compartments, said means automatically stopping further movement of said compartments when they reach dumping position.

5. A measuring device comprising a shaft, a plurality of discs adjustable along said shaft, radially extending members adjustably connected to each other, and cooperating with said discs for forming a plurality of rows of compartments, said shaft being rotatable in a predetermined direction when one row of said compartments are filled and means for preventing rotation of said shaft in an opposite direction.

6. A measuring device comprising a rotatable shaft, a plurality of compartments radially disposed about said shaft, stops arranged on said shaft for positioning the compartments off center so that a filling of the compartments will tend to rotate them about the shaft, and a keeper manually reciprocated for successively engaging with said stops after each movement whereby a new set of empty compartments will be brought into filling position and will be stopped in this position for each movement of said keeper.

FRANK M. MILES.